United States Patent
Watanabe

(10) Patent No.: US 7,773,135 B2
(45) Date of Patent: Aug. 10, 2010

(54) IMAGING APPARATUS

(75) Inventor: Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 536 days.

(21) Appl. No.: 11/798,442

(22) Filed: May 14, 2007

(65) Prior Publication Data
US 2007/0268385 A1 Nov. 22, 2007

(30) Foreign Application Priority Data
May 15, 2006 (JP) .............. P2006-135411

(51) Int. Cl.
*H04N 9/64* (2006.01)
*H04N 5/217* (2006.01)

(52) U.S. Cl. .................. 348/246; 348/241

(58) Field of Classification Search .......... 348/241–251
See application file for complete search history.

(56) References Cited

U.S. PATENT DOCUMENTS

| | | | | |
|---|---|---|---|---|
| 5,995,675 A * | 11/1999 | Hwang | ......... | 382/268 |
| 2002/0015111 A1 * | 2/2002 | Harada | ......... | 348/642 |
| 2003/0169352 A1 * | 9/2003 | Kitani | ......... | 348/247 |
| 2003/0179418 A1 * | 9/2003 | Wengender et al. | ......... | 358/437 |
| 2006/0092477 A1 * | 5/2006 | Okado | ......... | 358/448 |
| 2006/0238629 A1 * | 10/2006 | Sato et al. | ......... | 348/241 |

FOREIGN PATENT DOCUMENTS

JP 2004-88209 A 3/2004

* cited by examiner

*Primary Examiner*—Jason Chan
*Assistant Examiner*—Tuan H Le
(74) *Attorney, Agent, or Firm*—Birch, Stewart, Kolasch & Birch, LLP

(57) ABSTRACT

An imaging apparatus is provided and includes: a solid-state imaging device; and a correction section that corrects a defective signal contained in image signals output from the solid-state imaging device, the number of defective signals differing in accordance with an imaging condition, the correction section changing a manner of correction in accordance with the imaging condition.

2 Claims, 3 Drawing Sheets

| ISO SENSITIVITY | ADDRESS OF DEFECTIVE SIGNALS (x, y) |
|---|---|
| 100 | (1, 1) |
| 200 | (1, 1) (1, 2) |
| 400 | (1, 1) (1, 2) (1, 3) (1, 4) |
| 800 | (1, 1) (1, 2) (1, 3) (1, 4) (1, 5) (1, 6) (1, 7) (1, 8) |

HCCD SIDE

IMAGING APPARATUS

BACKGROUND OF THE INVENTION

1. Field of the Invention

The present invention relates to an imaging apparatus having a solid-state imaging device and a correction unit that corrects defective signals contained in a plurality of image signals output from the solid-state imaging device.

2. Description of Related Art

A CCD solid-state imaging device includes a plurality of photoelectric conversion elements, a plurality of vertical transfer section (VCCDs) where charges generated at the plurality of photoelectric conversion elements are read out and transferred in a vertical direction, a horizontal transfer section (HCCD) where the charges transferred through the plurality of VCCDs are transferred in a horizontal direction orthogonal to the vertical direction, and an output section that outputs an image signal corresponding to the charges transferred through the HCCD.

The VCCDs include charge transfer channels formed in a silicon substrate and a plurality of electrodes formed above the electrode transfer channels through a gate insulation film. FIG. 4 is a sectional view of a VCCD, which is 8-phase driven, having four electrodes correspondingly to one photoelectric conversion element. The reference character "C" designates a charge transfer channel, and the reference characters V1-V8 are electrodes provided above the charge transfer channel. The electrodes V1, V5 are respectively assumed serving also as read electrodes to read out a charge from the photoelectric conversion element. In the VCCD, It is assumed that potential wells P1, P2 are respectively formed under the electrodes V1, V2 and V5, V6 so that charges generated at the photoelectric conversion element are read in the potential wells P1, P2 and then transferred in the arrow direction in FIG. 4. Here, it is also assumed that a defect exists in the charge transfer channel of the VCCD and the defect causes a potential failure 21, the potential of which is suddenly deepened, in the potential well P2 under the electrodes V5, V6.

When charges are transferred through the VCCD having the potential failure 21, charges are to build up there each time passing over the potential failure 21, and thus the number of charges read out from the device is decreased. For example, provided that the potential failure 21 has a capacitance of 10 charges and the amount of charges read out from a photoelectric conversion element is 5 in average, the charges obtained from two photoelectric conversion elements build up at the potential failure 21. No signal output is available based on the charges stored in the potential failure 21. Consequently, an image 30, obtained by imaging a pure white subject, is blackened only at two pixels as shown in FIG. 5A. These are defective pixels 22.

Meanwhile, provided that the potential failure 21 has a capacitance of 10 charges and the amount of charges read out from a photoelectric conversion element is 1 in average, the charges obtained from the photoelectric conversion elements build up at the potential failure 21. No signal output is available based on the charges stored in the potential failure 21. Consequently, an image 30, obtained by imaging a pure white subject, is blackened only at ten pixels as shown in FIG. 5B. These are defective pixels 22.

The average amount of charges read out from a photoelectric conversion element changes in accordance with an ISO sensitivity of the device. The number of defective pixels increases with the increase of the ISO sensitivity while the number of defective pixels decreases with the decrease of the ISO sensitivity. Namely, the number of defective pixels is in proportional relationship with the ISO sensitivity.

There is known a technique to correct a defective pixel with use of its surrounding pixels. However, where defective pixels differ in number with a change of ISO sensitivity as noted above, devising is required for the manner of correction. No effective corrections have been available in the related art. For this reason, where there is a defective pixel resulting from a potential failure as noted above, it is a practice to determine that an solid-state imaging device having such a potential failure is unacceptable not to be shipped to the market.

JP-A-2004-88209 is a document related to a digital camera having a function to correct defective pixels. In this digital camera, whether or not correction of defective pixel is performed is selectable in accordance with an ISO sensitivity of the digital camera. However, this document does not describe how to correct a defective pixel resulting from such a potential failure as mentioned above.

SUMMARY OF THE INVENTION

An object of an illustrative, non-limiting embodiment of the invention is to provide an imaging apparatus capable of correcting defective pixels differing in accordance with an imaging condition, such as ISO sensitivity.

According to an aspect of the invention, there is provided an imaging apparatus comprising: a solid-state imaging device; and a correction section that corrects a defective signal contained in image signals output from the solid-state imaging device, the number of defective signals differing in accordance with an imaging condition, the correction section changing a manner of correction in accordance with the imaging condition.

In the imaging apparatus, the imaging condition may be an imaging sensitivity of the imaging apparatus.

The imaging apparatus may further comprise a storage section that stores, with respect to every imaging conditions, positional information of a defective signal that occurs upon imaging under an imaging condition. When imaging is performed under an imaging condition (i.e., an image of a subject is taken under an imaging condition), the correction unit may correct an image signal specified by the positional information corresponding to the imaging condition, based on another image signal around the image signal specified by the positional information.

In the imaging apparatus, the solid-state imaging device may comprise: a plurality of photoelectric conversion elements generating charges; a plurality of vertical transfer sections that read out the charges from the plurality of photoelectric conversion elements and transfers the charges in a vertical direction; and a horizontal transfer section that transfers the charges, which are transferred through the plurality of vertical transfer sections, in a horizontal direction orthogonal to the vertical direction. The defective signal can be defined as a signal resulting from a potential failure in the plurality of vertical transfer sections.

In the imaging apparatus, the solid-state imaging device may comprise: a plurality of photoelectric conversion elements generating charges; a plurality of vertical transfer sections that read out the charges from the plurality of photoelectric conversion elements and transfers the charges in a vertical direction; and a horizontal transfer section that transfers the charges, which are transferred through the plurality of vertical transfer sections, in a horizontal direction orthogonal to the vertical direction. The defective signal can be defined as a signal resulting from a potential failure in the plurality of vertical transfer sections. The imaging apparatus may further comprise a storage section that stores, with respect to every imaging sensitivities lower than a reference value, positional information of a defective signal that occurs upon imaging under an imaging sensitivity lower than the reference value. When imaging is performed under an imaging sensitivity of the reference value or more (i.e., an image of a subject is taken under the imaging sensitivity), the correction unit may correct (i) an common image signal specified by the positional information commonly corresponding to the imaging sensitivities lower than the reference value and (ii) a first image signal that: corresponds to a charge read out to a vertical transfer section to which a charge forming the common image signal is read out; and is output after the common image signal, based on another image signals around the common image signal and the first image signal. When imaging is performed under the imaging sensitivity lower than the reference value (i.e., an image of a subject is taken under the imaging sensitivity), the correction unit may correct a second image signal specified by the positional information corresponding to the image sensitivity, based on another image signal around the second image signal.

In imaging apparatus, the solid-state imaging device may comprises a plurality of photoelectric conversion elements generating charges; a plurality of vertical transfer sections that read out the charges from the plurality of photoelectric conversion elements and transfers the charges in a vertical direction; and a horizontal transfer section that transfers the charges, which are transferred through the plurality of vertical transfer sections, in a horizontal direction orthogonal to the vertical direction. The defective signal can be defined as a signal resulting from a potential failure in the plurality of vertical transfer section. The imaging apparatus may further comprise a storage section that stores, with respect to every imaging sensitivities lower than a reference value, positional information of a defective signal that occurs upon imaging under an imaging sensitivity lower than the reference value. When imaging is performed under an imaging sensitivity of the reference value or more, the correction unit corrects each of first image signals corresponding to charges read out to a vertical transfer section to which a charge forming a common image signal is read out, based on another image signal around the each image signal. When imaging is performed under the imaging sensitivity lower than the reference value, the correction unit corrects a second image signal specified by the positional information corresponding to the image sensitivity, based on another image signal around the second image signal.

BRIEF DESCRIPTION OF THE DRAWINGS

The features of the invention will appear more fully upon consideration of the exemplary embodiments of the inventions, which are schematically set forth in the drawings, in which.

DETAILED DESCRIPTION OF THE EXEMPLARY EMBODIMENTS

Although the invention will be described below with reference to the exemplary embodiment thereof, the following exemplary embodiment and its modification do not restrict the invention.

According to an exemplary embodiment of the invention, an imaging apparatus can correct for defective pixels differing in accordance with an imaging condition, such as ISO sensitivity.

With reference to the drawings, explanation will be made on exemplary embodiments according to the invention.

Figure 1:
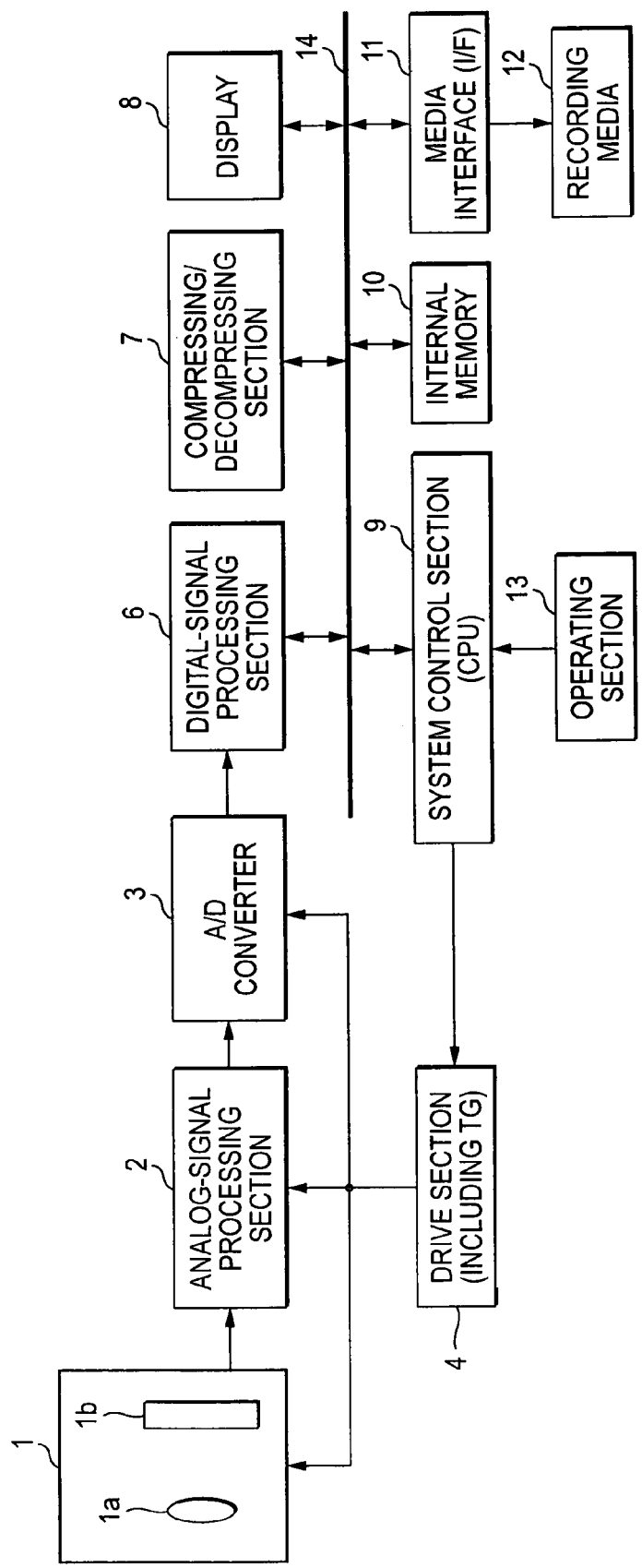
FIG. 1 is a block diagram showing a schematic configuration of a digital camera as an exemplary embodiment of an imaging apparatus according to an exemplary embodiment according to the present invention.

FIG. 1 is a block diagram showing a schematic configuration of a digital camera, as an exemplary embodiment of an imaging apparatus according to an exemplary embodiment of the invention.

A digital camera, shown in FIG. 1, includes an imaging section 1, an analog-signal processing section 2, an A/D converter section 3, a drive section 4, a digital-signal processing section 6, a compressing/decompressing section 7, a display 8, a system control section 9, an internal memory 10, a media interface (I/F) 11, a recording media 12 and an operating section 13. The digital-signal processing section 6, the compressing/decompressing section 7, the display section 8, the system control section 9, the internal memory 10 and the media interface 11 are connected to a system bus 14.

The imaging section 1 takes an image of a subject by means of an optical system including an objective lens 1a and a CCD solid-state imaging device 1b, and to output an analog image signal. The analog-signal processing section 2 performs an analog-signal processing on the image signal obtained at the imaging section 1. The A/D converter section 3 converts the analog signal, processed by the analog-signal processing section 2, into a digital signal.

The drive section 4 supplies a pulse to the solid-state imaging device 1b, analog-signal processing section 2 and A/D converter section 3 according to a drive pulse supplied from the system control section 9 and drives those sections, when the digital camera is set in an imaging mode (i.e., a mode in which a subject can be taken an image and the imaging data can be recoded). The imaging mode includes a still-imaging mode allowing for recording still-image data and a moving-imaging mode allowing for recording moving-image data.

The digital-signal processing section 6 performs a digital-signal processing on the digital signal from the A/D converter section 3 in accordance with an operation mode set at the operating section 13, and to produce image data. The digital-signal processing section 6 performs a processing, including defective signal correction, black-level correction (OB process), linear-matrix correction, white-balance correction, gamma correction, synchronization and Y/C conversion. The digital-signal processing section 6 is configured by a DSP (digital signal processor), for example.

The compressing/decompressing section 7 performs a compression on the image data produced by the digital-processing section 6 and a decompression on the compressed image data obtained from the recording media 12.

The display section 8 includes an LCD (liquid crystal display), for example, to display an image based on the image data subjected to digital-signal processing after taken. It also displays an image based on the image data obtained by decompressing the compressed image data recorded on the recording media 12. Besides, it can display a through-image during the imaging mode and information about various states and operation of the digital camera.

The system control section 9 is configured mainly by a processor operating according to a program, to take total control of the digital camera overall.

The internal memory 10 is a DRAM, for example, to be utilized as a buffer memory for temporarily storing image data to be recorded in the recording media 12 and as a buffer memory for image data to the display section 8 besides utilized as a work memory for the digital-signal processing section 6 and system control section 9. The media interface 11 inputs and outputs data to and from the recording media, such as a memory card.

The operating section 13 allows for various operations in using the digital camera, which includes a release button (not shown) with which an imaging instruction is to be made. The digital camera, shown in FIG. 1, can be set with an ISO sensitivity, as one of imaging conditions, at four levels of 100, 200, 400 and 800, for example. The ISO sensitivity can be manually set by operating the operating section 13 or be automatically set internally of the camera in accordance with an imaging environment. In this specification, ISO sensitivities of 100 and 200 are represented as low sensitivities while ISO sensitivities of 400 and 800 are represented as high sensitivities.

Then, explanation is made on a defective signal correction to be made by the digital-signal processing section 6. From now on, it is assumed that a potential failure as mentioned before occurs in a VCCD of the solid-state imaging device 1b. An image signal, whose signal level is substantially lost by the buildup of charges at the potential-failure point, is referred to as a defective signal.

Figures 2, 3:
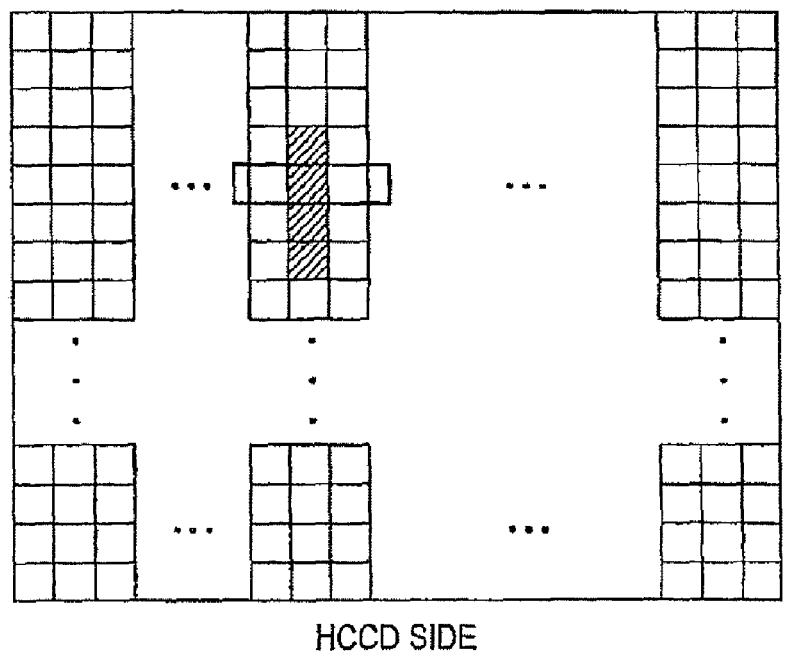
FIG. 2 is a figure showing information stored in a memory incorporated in a digital-signal processing section in FIG. 1.
FIG. 3 is a figure showing a two-dimensional map of an image signal output from a solid-state imaging device when imaging is performed at an ISO sensitivity of 400.
Figure 4:
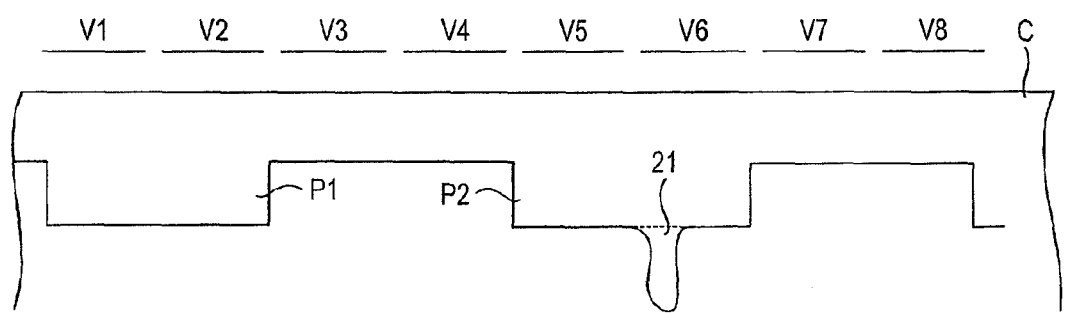
FIG. 4 is a sectional view of a VCCD, which is 8-phase-driven, having four electrode correspondingly to one photoelectric conversion element.
Figure 5A:
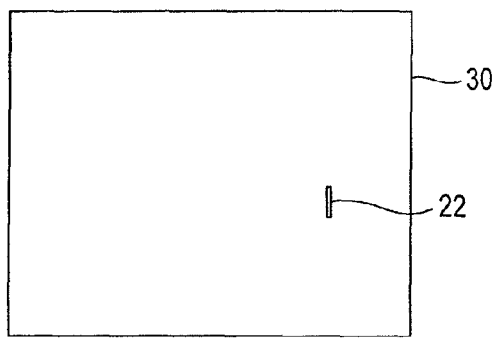
FIGS. 5A and 5B are figures showing defective pixels resulting from a potential failure.
Figure 5B:
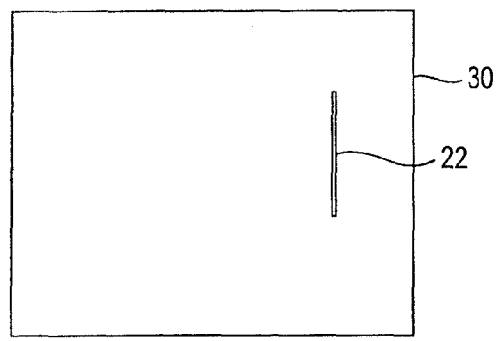

The digital-signal processing section 6 incorporates therein a memory, not shown. This memory stores an address (positional information) of defective signals that might occur upon taking an image at an imaging sensitivity, for each of ISO sensitivities. For example, before shipment of the digital camera, addresses of defective-signals can be known based on image signal obtained by taking an image of a white subject by use of the digital camera. Provided that the y-coordinate is taken in the direction where the VCCDs of the solid-state imaging device 1b extends while the x-coordinate is in the direction where the HCCD thereof extends, the memory within the digital-signal processing section 6 stores a table, say, as shown in FIG. 2. The address y, shown in FIG. 2, means that the image signal was obtained from a photo-electric conversion element located greater in distance from the HCCD as the y value increases.

When acquiring an image signal output from the solid-state imaging device 1b in taking an image at an ISO sensitivity, the digital-signal processing section 6 reads an address corresponding to the ISO sensitivity, from the table shown in FIG. 2. Among the acquired image signals, the image signal specified by the read-in address (i.e. defective signal) is corrected based on an image signal around the defective signal.

FIG. 3 is a figure showing a two-dimensional map of image signals output from the solid-state imaging device 1b when taking an image at an ISO sensitivity of 400.

Each of squares shown in FIG. 3 represents an image signal, wherein the hatched area represents the defective signals (i.e., the image signals specified by the address corresponding to the ISO sensitivity of 400). In the case where an image is taken at an ISO sensitivity of 400, the digital-signal processing section 6 corrects each of the four image signals shown with hatching among the image signals shown in FIG. 3 obtained from the solid-state imaging device 1b, based on the adjacent image signals shown unhatched. The correction is by a process in which the adjacent image signals, on both sides of each of the four image signals, are taken an average to provide a corrected image signal.

Defective pixels can be eliminated by correcting, at all times, the image signal specified by the address corresponding to the maximum ISO sensitivity, among the image signals obtained by taking an image. However, with this method, when the ISO sensitivity is low and defective signals are decreased, correction is done also on normal image signals thus deteriorating the image quality. On the contrary, the digital camera in this embodiment can make a proper correction based on each ISO sensitivity while changing a manner of defective-signal correction in accordance with each ISO sensitivity, thus suppressing the image-quality deterioration to a minimal extent.

Incidentally, although the addresses shown in FIG. 2 are those of defective signals obtained upon taking a reference image, such as white paper, it can be considered that, in the actual imaging, a black subject be present in the area surrounded by the bold lines in FIG. 3. In case there is a black subject in this location, the number of defective signals itself is unchanged from that in taking the reference image. However, the defective signal deviates in position toward the opposite to the HCCD.

In this case, when the defective signals are corrected according to the addresses shown in FIG. 2, uncorrected defective signals possibly remain. When the total number of defective signals is smaller as in the case at an ISO sensitivity of 100 or 200, the defective signal if not corrected poses not so serious. However, when the total number of defective signals are greater, conspicuous deterioration encounters in image quality.

For this reason, in the case where an image is taken at an high sensitivity, correction is preferably made on an image signal specified by an address (1,1) corresponding commonly to all the ISO sensitivity (i.e., a common image signal) and on an image signal corresponding to charges read out to the VCCD, to which charges forming the image signal specified by the address (1,1) are read out, (synonymous with all the image signals whose address is 1 on x-coordinate) and output after the image signal by the address (1,1), based on image signals around those (e.g. those image signals are each replaced with the adjacent image signal present on the right or left thereof). In the case where an image is taken at a low sensitivity, correction is preferably made on an image signal specified by an address corresponding to the ISO sensitivity, based on image signals around it. This can prevent against the situation that no corrections are done on defective signals where taking an image at the high sensitivity.

In such a case, it is satisfactory to know the start address of defective signals when taking an image at a high sensitivity. This makes unnecessary addresses at ISO sensitivities of 400 and 800 shown in FIG. 2, thus making it possible to reduce the memory capacity. Otherwise, in place of the address at ISO sensitivities of 400 and 800 shown in FIG. 2, defective signals may be stored only in the addresses on X-coordinate.

Meanwhile, when an image is taken at a high sensitivity, the digital-signal processing section 6 may correct image signals corresponding to all the charge read to a VCCD, to which charges forming an image signal specified by an address (1,1), corresponding commonly to all the ISO sensitivities (i.e., a common image signal), are read out, (synonymous with all the image signals whose address is 1 on x-coordinate), based on image signals around those (e.g. those image signals are each replaced with the adjacent image signal present on the right or left thereof). When an image is taken at a high sensitivity, correction may be made on an image signal specified by an address corresponding to the ISO sensitivity, based on image signals around it. This also can prevent against the situation that no corrections are done on defective signals where taking an image at high speed.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-135411, filed May 15, 2006, the entire disclosure of which is herein incorporated by reference.

What is claimed is:

1. An imaging apparatus comprising:
a solid-state imaging device; and
a correction section that corrects defective signals contained in image signals output from the solid-state imaging device, the number of defective signals differing in accordance with an imaging condition, the correction section changing a manner of correction in accordance with the imaging condition
wherein the imaging condition is an imaging sensitivity of the imaging apparatus,
the solid-state imaging device comprises: a plurality of photoelectric conversion elements generating charges; a plurality of vertical transfer sections that read out the charges from the plurality of photoelectric conversion elements and transfers the charges in a vertical direction; and a horizontal transfer section that transfers the charges, which are transferred through the plurality of vertical transfer sections, in a horizontal direction orthogonal to the vertical direction,
the defective signals occur based on a potential failure in one of the plurality of vertical transfer sections,
the potential failure corresponds to a first defective pixel,
the defective signals correspond to the first defective pixel and second defective pixels, the first defective pixel and the second defective pixels are arranged successively in the same vertical transfer section,
the imaging apparatus further comprises a storage section that stores, with respect to every imaging sensitivity lower than a reference value, positional information of the defective signals that occur upon imaging under an imaging sensitivity lower than the reference value, and
wherein when imaging is performed under an imaging sensitivity of the reference value or more, the correction unit corrects (i) a common image signal specified by the positional information commonly corresponding to the imaging sensitivities lower than the reference value and (ii) a first image signal that: corresponds to a charge read out to the same vertical transfer section to which a charge forming the common image signal is read out;
and is output after the common image signal, based on other image signals around the common image signal and the first image signal, and
when imaging is performed under the imaging sensitivity lower than the reference value, the correction unit corrects a second image signal specified by the positional information corresponding to the image sensitivity, based on another image signal around the second image signal.

2. An imaging apparatus comprising:
a solid-state imaging device; and
a correction section that corrects defective signals contained in image signals output from the solid-state imaging device, the number of defective signals differing in accordance with an imaging condition, the correction section changing a manner of correction in accordance with the imaging condition,
wherein the imaging condition is an imaging sensitivity of the imaging apparatus,
the solid-state imaging device comprises: a plurality of photoelectric conversion elements generating charges; a plurality of vertical transfer sections that read out the charges from the plurality of photoelectric conversion elements and transfers the charges in a vertical direction; and a horizontal transfer section that transfers the charges, which are transferred through the plurality of vertical transfer sections, in a horizontal direction orthogonal to the vertical direction,
the defective signals occur based on a potential failure in one of the plurality of vertical transfer sections,
the potential failure corresponds to a first defective pixel,
the defective signals correspond to the first defective pixel and second defective pixels, the first defective pixel and the second defective pixels are arranged successively in the same vertical transfer section,
the imaging apparatus further comprises a storage section that stores, with respect to every imaging sensitivity lower than a reference value, positional information of a defective signal that occurs upon imaging under an imaging sensitivity lower than the reference value and
wherein when imaging is performed under an imaging sensitivity of the reference value or more, the correction unit corrects each of first image signals corresponding to charges read out to a vertical transfer section to which a charge forming a common image signal is read out, based on another image signal around the each image signal, and
when imaging is performed under the imaging sensitivity lower than the reference value, the correction unit corrects a second image signal specified by the positional information corresponding to the image sensitivity, based on another image signal around the second image signal.

* * * * *